United States Patent [19]
Sudau

[11] Patent Number: 5,735,768
[45] Date of Patent: Apr. 7, 1998

[54] TORSIONAL VIBRATION DAMPER WITH VARIABLE TRANSMISSION

[75] Inventor: Jörg Sudau, Niederwerrn, Germany

[73] Assignee: Fichtel & Sachs AG, Schweinfurt, Germany

[21] Appl. No.: 680,150

[22] Filed: Jul. 15, 1996

[30] Foreign Application Priority Data

Jul. 15, 1995 [DE] Germany .................. 195 25 842.8

[51] Int. Cl.$^6$ ................................................ F16D 3/80
[52] U.S. Cl. .................. 475/347; 192/70.17; 74/574; 464/68
[58] Field of Search .................. 192/70.17, 212; 74/574, 573 R, 573 F; 475/331, 346, 347; 464/24, 66, 67, 68

[56] References Cited

U.S. PATENT DOCUMENTS 5,551,928   9/1996   Sudau ........................ 475/347

FOREIGN PATENT DOCUMENTS 9414314   6/1995   Germany .
2285109   6/1995   United Kingdom .
2296072   6/1996   United Kingdom .

Primary Examiner—Charles A. Marmor
Assistant Examiner—Saúl J. Rodriguez
Attorney, Agent, or Firm—Cohen, Pontani, Lieberman & Pavane

[57] ABSTRACT

A torsional vibration damper has an drive-side transmission element with at least one planet carrier rotatable relative thereto. The planet carrier is provided with at least one planetary gear, which is engaged with a sun gear on the one hand and with an internal gear on the other. In addition, there is an output-side transmission element, and one of the transmission elements has a control mechanism for a spring device arranged between the transmission element and at least one planetary gear train element. The planetary gear train element can be driven for a movement that depends on the speed and rotational direction of the two transmission elements relative to one another. At least two of the planetary gear train elements are designed, within a predeterminable roll-off range, with a generating cam eccentric to the associated bearing of the planetary gear train element, through which it is possible to change the distance of the interengagement of the two planetary gear train elements from their bearings for the purpose of adjusting the transmission of the planetary gear train in dependence on the deflection amplitude of the two transmission elements relative to one another.

5 Claims, 2 Drawing Sheets

TORSIONAL VIBRATION DAMPER WITH VARIABLE TRANSMISSION

FIELD OF THE INVENTION

The invention relates to a torsional vibration damper.

DISCUSSION OF THE PRIOR ART

German reference DE GM 94 14 314 discloses a torsional vibration damper for the clutches of vehicles. This device has a drive-side transmission element and two planet carriers rotatable relative to the drive-side transmission element. The planet carriers bear a plurality of planetary gears, each of which is engaged with a sun gear on the one hand and with an internal gear on the other. One of these planetary gear train elements, preferably the internal gear or the planet carriers, is connected to an output-side transmission element. The function of this arrangement is such that a torque introduced by the drive-side transmission element is passed to the sun gear and from the latter is branched via the planetary gears to the internal gear as well as to the planet carriers. This leads to a relative deflection between the internal gear and the planet carriers, as a result of which the springs of a spring device active in the circumferential direction, which are arranged in the radially outer area of the torsional vibration damper, undergo a deformation and in this way exercise their damping effect. This damping effect is required for the vibrational decoupling of the output-side transmission element from the drive-side transmission element.

It is disadvantageous, however, that once a spring device adjusted to the torsional vibration damper is put into place, the damping behavior of the torsional vibration damper can no longer be changed. This applies, first of all, to the resistance of the springs counter to deformation and, secondly, to the deflection speed of the springs or of sliding shoes arranged between them, and thus to the displacement speed of the viscous medium surrounding the spring device. Accordingly, the torsional vibration damper is adjustable only so as to provide useful damping properties in as many different operating states as possible. There is no way for the damper to react to changing operating states with the optimum damping behavior for a particular given case, for example, during alternation between coasting and tractive operation.

SUMMARY OF THE INVENTION

Accordingly, it is an object of the present invention to provide a torsional vibration damper that, regardless of its particular operating state, provides optimum decoupling quality between a drive-side transmission element and an output-side transmission element.

Pursuant to this object, and others which will become apparent hereafter, one aspect of the present invention resides in a torsional vibration damper having a drive-side transmission element, at least one planet carrier rotatable relative to the drive side transmission element, a planetary gear train, and an output-side transmission element connected to the planet carrier. The planetary gear train is made up of elements that include at least one planetary gear, a sun gear engaged with the planetary gear and an internal gear engaged with the planetary gear. The planetary gear train elements are drivable for movement dependent on one of speed and rotational direction of the two transmission elements relative to one another. At least two of the planetary gear train elements have an associated bearing and are formed, within a predeterminable roll-off range, with a respective contact curve eccentric to the associated bearing so that it is possible to change the distance of interengagement of the two planetary gear train elements from their bearing so as to adjust the gearing of the planetary gear train as a function of relative deflection width of the transmission elements relative to one another.

Measurements carried out on a torsional vibration damper with a planetary gear train between the drive-side and the output-side transmission elements have shown that, after passage through a resonance frequency, which is preferably set, by appropriate design of the torsional vibration damper, in a speed range where the amplitudes of the torsional vibrations introduced by the drive are not yet great enough to disturb the torsional vibration damper, as is the case, for example, in a speed range just above the starter motor speed, a speed ensues at which the decoupling quality between the drive-side and the output-side transmission element assumes a maximum. After passage through this speed of highest decoupling quality, which hereinafter will be referred to as the "decoupling speed," the decoupling quality again declines, i.e., torsional vibrations introduced by the drive-side transmission element arrive at the output-side transmission element in a much more poorly filtered state than is the case at the decoupling speed.

This fact is taken advantage of by the present invention on torsional vibration dampers with planetary gear trains, in that the generating cams of every two interengaged planetary gear train elements are designed eccentrically and thus it is possible to move the distance of the interengagement of the two planetary gear train elements relative to the bearings of the latter and, in this way, to change the transmission of the planetary gear. According to the invention, this change is carried out in dependence on the deflection width of the two transmission elements relative to one another, so that starting from a neutral position in which no relative deflection exists, there is a definite gear transmission between the drive-side and the output-side transmission elements for each deflection position. As a result, each time there is a change in the rotational angle of, for example, the planetary gears relative to the sun gear, it is possible to achieve a change (dependent on the change in transmission) in the moment, which causes a deflection of the spring device, through which the deflection speed of the springs of the spring device is in turn influenced. In this way, the damping effect attainable by means of the spring device can be adjusted in each case to the relative deflection of the two transmission elements relative to one another, because when a higher moment is passed to the spring device, the counteracting spring force appears weaker than when the moment is lower. In turn, the reduced resistant action of the springs means that when the moment is passed along the springs deform more quickly, so that the springs, as well as any sliding shoes located between them, displace the viscous medium contained in a grease box accommodating the spring device more quickly than would be the case at a lower deflection speed. The result is an increase in the medium-based damping resistance. Thus, a suitable design of the generating cams of the interengaged planetary gear train elements makes it possible to increase the damping resistance as the relative deflection of the two transmission elements to one another increases. Similarly, it is possible, starting from the neutral position, to build up a completely different damping effect in a first rotational direction than in the opposite rotational direction, so that the damping effect of the torsional vibration damper is different in tractive operation than it is in coasting operation.

Returning to the aforementioned decoupling quality of the torsional vibration damper in dependence on speed, the result of the inventive features is that, instead of there being a maximum final coupling quality at a certain firmly established speed, the maximum decoupling quality is found within a much broader speed range, the breadth of which depends on the design of the generating cams of the planetary gear train elements which bring about the change in transmission. Thus, sudden load-reversal shocks can be decoupled in an outstanding manner prior to transmission to the other transmission dement, even when these load-reversal shocks occur at speeds far removed from the final &coupling speed that would exist were it not for the changeable transmission.

In another embodiment of the invention the planetary gear has a tooth circumference that is at least partially formed with a continuous diameter change that acts as a contact curve. The contact curve of the planetary gear is in toothed connection with a counter-contact curve of at least one other gear of the planetary gear train. The counter-contact curve has a diameter change in an opposite sense relative to the contact curve relative to the distance of the interengagement and the bearing. Thus, the interengagement, in subordination to a particular relative deflection width of the two transmission elements relative to one another assumes a position which, in keeping with a particular transmission or gearing requirement can be moved out of a neutral position by a predetermined extent in a direction of one of the bearings of the toothed gears that are in tooth connection.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENT

Figure 1:
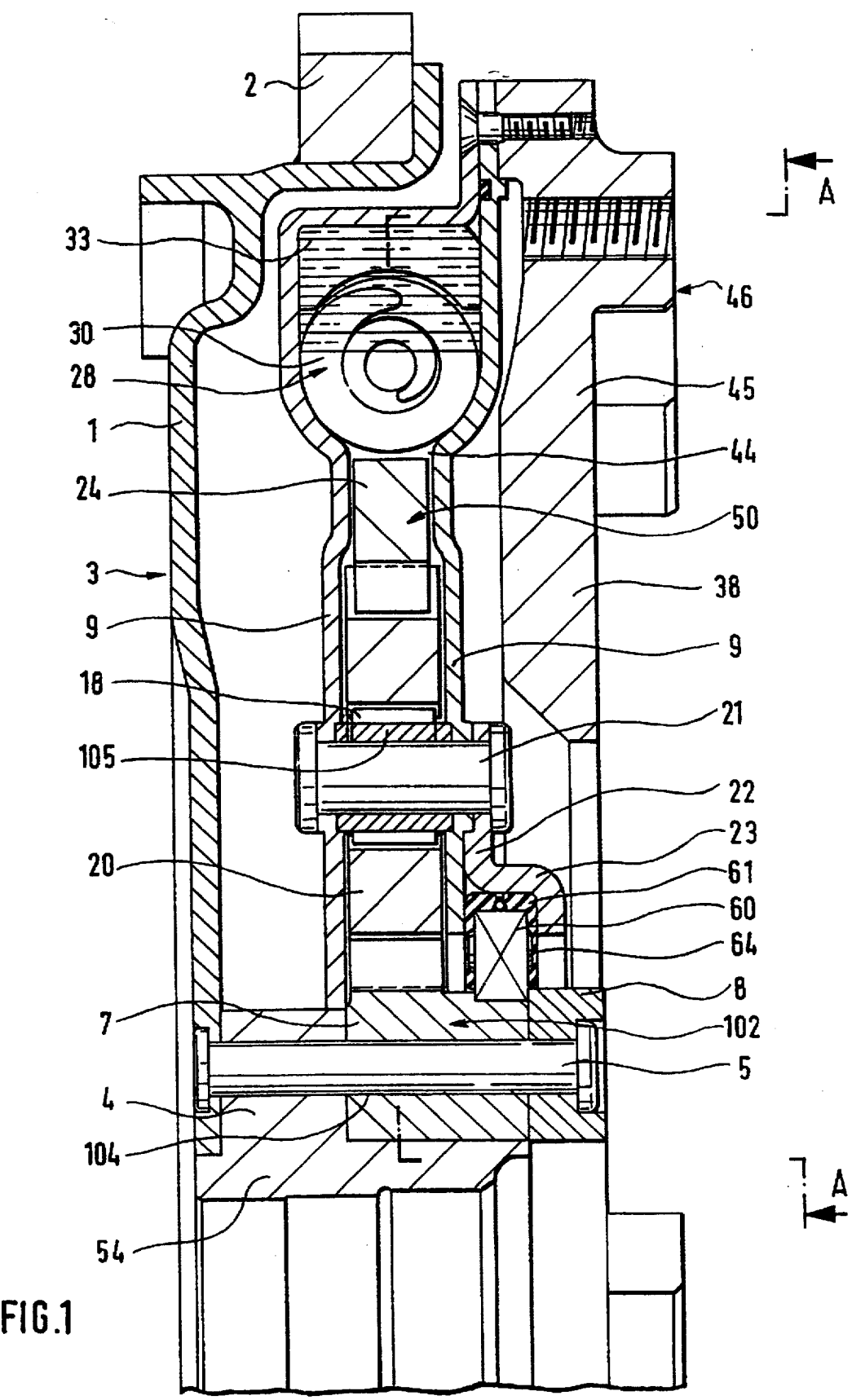
FIG. 1 is a sectional view of a torsional vibration damper with a planetary gear train active between two transmission elements pursuant to the present invention.

FIG. 1 shows a torsional vibration damper, which on its left side has an inertia mass 1 that serves to introduce a drive movement and in the circumferential area acts with a toothed gear 2 for a staging motor pinion (not shown). The inertia mass 1 acts as a drive-side transmission element 3.

The inertia mass 1, together with a flange 8 and a sun gear 7 (located on a hub 4) of a planetary gear train 102, is attached by to the hub 4 by rivets 5. The hub 4 can be located on a crank shaft (not shown) of an internal combustion engine. The inertia mass 1, the hub 4, the sun gear 7 and the flange 8, respectively, have passage holes 104 for the rivets 5, via which the components can be held at rest against one another in a non-positive fashion.

The planetary gear train 102 has planet carriers 9 arranged on both sides of the sun gear 7. The planet carrier on the left in FIG. 1 extends radially inward to the hub 4, while the planet carrier on the right comes to rest with its radially inner end on a shield 61 encircling a mounting 60. The shield 61 has arms 64 reaching radially inward to the inner bearing ring for the purpose of performing a sealing function relative to a chamber 44 at least partially filled with viscous medium and also relative to the greased area surrounding the generating cams of the mounting 60.

The two planet carriers 9 are provided with a plurality of bearings 18, for example, needle bearings arranged at equal diameters. A planetary gear 20 is mounted on each bearing and is arranged between the two planet carriers 9. The planetary gears 20 are held relative to one another in the axial direction at a set distance from one another by sleeves 105, and are drawn firmly against both ends of the respective sleeves 105 by rivets 21 arranged in the sleeves 105. The rivets 21 also connect a disk 22 in a rotation-proof manner to the planet carrier 9 that faces away from the primary inertia mass 1. A shoulder 23 molded on the disk 22 comes to rest on the shield 61 on a side facing away from the planet carrier 9.

The planetary gears 20 are engaged with the sun gear 7, on the one hand, and on the other hand intermesh with an internal gear 24, which is also located between the two planet carriers 9 and acts as an intermediate mass 50. The internal gear 24, outside of its toothed engagement with the planetary gears 20, has recesses 110 (FIG. 2) designed at predetermined angular distances relative to one another. In each of the recesses 110 is placed a spring device 28 which has a plurality of springs 30 that are connected to one another by sliding shoes 33 in a manner known from the aforementioned reference DE 94 14 314. At one end, the spring device 28 is supported via carriers 112 on a radial protrusion 114 of the internal gear 24. At the other end, the spring device 28 is supported on a controlling means (not shown) of the planet carrier 9.

The spring device 28 is arranged, in the axial direction of the hub, between the two planet carriers 9, which are securely connected in the radially outer area to one another as well as to a balance wheel 38 of a second inertia mass 45. The planet carriers 9 border the aforementioned chamber 44, which is part of the second inertia mass 45, accommodates the toothed gears 7, 20, 24 as well as the spring device 28, and is at least partially filled with a paste-type medium. The toothed gears 20, 24 are secured in the axial direction by the planet carriers 9. The second inertia mass 45 serves as the output-side transmission element 46, which is provided to accommodate a friction-locking or positive-locking coupling in a manner not shown.

Figure 2:
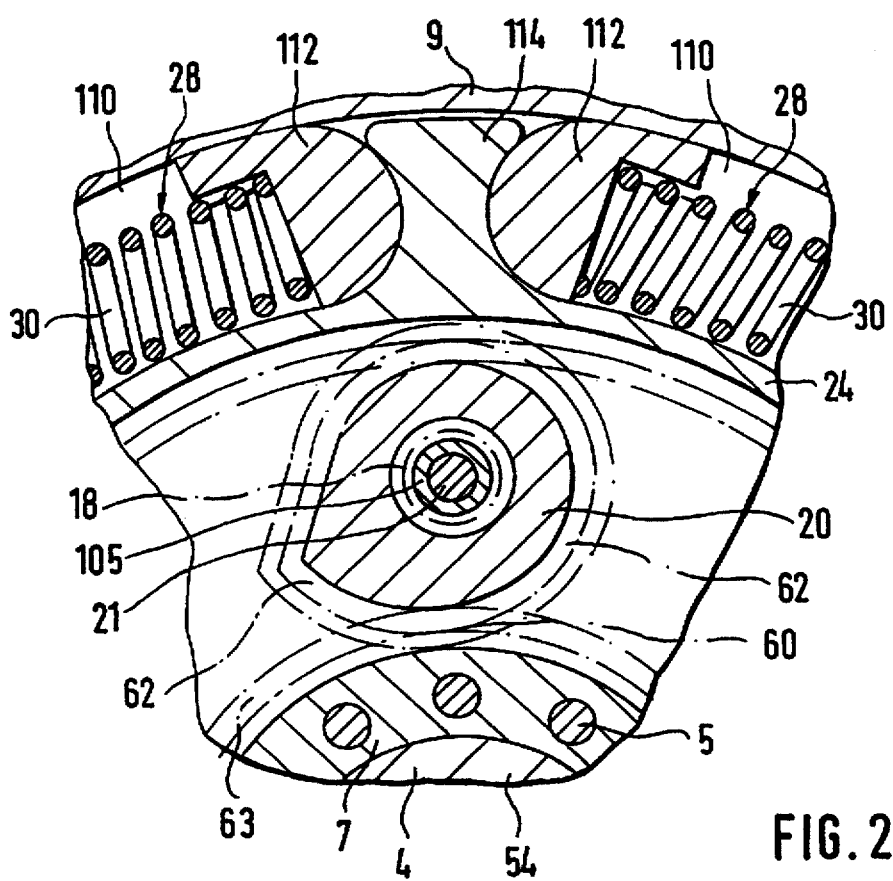
FIG. 2 is a section through the planetary gear train, along the line A—A in FIG. 1, on a reduced scale.

The subject matter of the invention can be seen most clearly in FIG. 2. As FIG. 2 shows in reference to the planetary gear 20, this planetary gear 20, at its point of interengagement 60 with the sun gear 7, is designed with a generating cam 62 of predeterminable eccentricity relative to the bearing 18. FIG. 2 shows the planetary gear train elements 7, 20, 24 in their neutral position, in which the two transmission elements 3, 46 have no relative deflection to one another. In the embodiment of the planetary gear 20 in FIG. 2, the area of the generating cam to the left of the vertical center line is designed strongly eccentric to the bearing 18, while the area of the generating cam 62 on the right of the center line has an eccentricity that closely approaches a circular shape. According to this embodiment of the generating cam 62 on the planetary gear 20, the associated counter-generating cam 63 is arranged on the sun gear 7, so that when the two generating cams 62, 63 roll relative to one another, as the corresponding planetary gear train elements 7, 20 rotate counter to one another, toothed engagement is maintained at all times, but the distance of the interengagement 60 from the bearing 18 of the planetary gear 20, on the one hand, as well as from the hub 4 serving as the bearing 54 of the sun gear 7, on the other, changes. Specifically, when the planetary gear 20 rolls off in the counterclockwise direction (as in FIG. 2) the distance is changed by a movement of the interengagement 60 radially inward toward the bearing 54 of the sun gear 7, whereas a movement of the planetary gear 20 in the opposite rotational direction, i.e., in the clockwise direction, results in a slight movement of the interengagement 60 toward the bearing 18 of the planetary gear 20. In this way, the transmission ratio between the sun gear 7 and the planetary gear 20 changes considerably when the planetary gear 20 is moved in the counterclockwise direction, while rolling the planetary gear 20 in the opposite direction has no significant impact on the transmission ratio. In the toothed area with the hollow internal gear 24, the planetary gear 20 is designed in a circular fashion, so that no transmission change can be achieved between these two planetary gear train elements.

The torsional vibration damper functions as follows:

When, during the use of an internal combustion engine as a drive, a torque is introduced that is overlaid by torsional vibrations, the movement that this triggers on the inertia mass 1 is passed to the sun gear 7, which, because of its intermeshing with the planetary gears 20, drives the latter. The torque is passed further via the planetary gears 20 to the planet carrier 9 and thus to the output-side transmission element 46, without any change in the rotational direction. Because the planet carrier 9, due to its inertia, continues initially to act in a rotation-proof manner, the movement of the sun gear 7 is converted into a rotation of the planetary gears 20 around the bearing 18 as well as into a movement of the bearing 18 itself and into a movement of the internal gear 24 around the bearing 54. In this way, the moment associated with the torsional vibration is branched into a first partial moment, which makes its way via the planetary gears 20 to the planet carriers 9, and a second partial moment, which is transmitted to the internal gear 24 acting as the intermediate mass 50.

If the moment associated with the torsional vibration introduced at the sun gear 7 is oriented in the clockwise direction (as in FIG. 1, for example), then a first partial moment acting in the counterclockwise direction causes the internal gear 24 to be deflected out of its rest position via the rotation of the planetary gears 20, while the planetary carriers 9 are driven by a second partial moment acting in the clockwise direction. In this way, a relative movement occurs between the planet carrier 9 and the internal gear 24, whereby the spring device 28 resting against the controlling means of the internal gear 24 and the planet carriers 9 undergoes a deformation of its springs 30 and, as a result, the sliding shoes 33 move along their sliding path. The length of the deformation distance of the spring device 28 depends, understandably, on the transmission of the planetary gear train 102. Because the planetary gears 20, as already described, are designed with an eccentric generating cam 62 relative to their bearing 18, via which they engage with a similar generating cam of the sun gear 7, every relative movement between the two transmission elements 3, 46 caused by the introduction of torsional vibrations changes the distance of the interengagement 60 of the two planetary gear train elements 7, 20 relative to the bearings 18 of the planetary gears 20 and to the bearing 54 of the sun gear 7, so that the aforementioned transmission of the planetary gear train 102 also changes. As a result, influence is exercised on the deflection amplitude as well as the deflection speed of the internal gear 24, and because the internal gear 24 is engaged via the controlling elements with the spring set 28, the deflection amplitude and speed of the interengagement 60 can be influenced as well. For example, when the sun gear 7 in FIG. 2 undergoes deflection in the clockwise direction, the distance between the bearing 18 of the planetary gear 20 and the interengagement 60 increases, but the distance between the latter and the bearing 54 of the sun gear 7 decreases. Thus a predeterminable angular deflection of the sun gear 7 in this direction results in a smaller angular deflection at the planetary gears 20 than would occur, for example, given a distance like that found in the neutral position in FIG. 2.

The smaller angular deflection of the planetary gears 20 means that the internal gear 24, which is engaged with the planetary gears, also carries out a reduced deflection movement, which, assuming a definite deflection speed at the sun gear 7, is smaller than it would be given the diameter ratios existing in the neutral position. As a result, the internal gear 24 is moved into its new position with lesser (always in reference to the situation in the neutral position) deflection amplitude and speed. This behavior of the internal gear 24 effects the controlling of the spring device 28, which as a result is deformed less strongly and at lower speed. The springs 30 accordingly display the behavior of springs of higher deformation resistance than is actually the case. Thus, the deformation behavior of the springs 30 of the spring device 28 is optimally adjustable, by means of the variable transmission, to the particular deflection of the two transmission elements 3, 46 relative to one another, so that an optimal spring characteristic is always established for each relative deflection amplitude of this type. This is also true in respect to the damping which depends on the viscous medium, because the variability of the transmission makes it possible to change the deflection speed of the springs 30, as well as of the sliding shoes 33 arranged between them, and thus to influence the displacement speed of the viscous medium in the grease chamber 44. Here it holds generally that a reduction in deflection speed, as illustrated by a generating cam 62, 63 on the sun gear and planet gear to the left of the vertical center line in FIG. 2, leads to a lower damping effect of the viscous medium.

When the sun gear 7 is deflected in the counterclockwise direction, the generating cams 62, 63, as well as the planetary gears 20 (which are shown on the right side of the vertical center line in FIG. 2), roll off one another, so that in this direction the distance between the interengagement 60 of the two toothed gears 7, 20 among themselves and the bearing 18 of the planetary gears 20 decreases. In contrast, the distance between the interengagement 60 and the bearing 54 of the sun gear 7 increases, because the circular shape is approached, but said distance increases only negligibly. As a result, the transmission is changed in such a way that a deflection of the sun gear 7 in the counterclockwise direction triggers a rotational movement of the planetary gears 20 around their bearings 18, during which the deflection amplitude and speed are greater than they would be given a similar transmission in the neutral position. This movement of the planetary gears 20 is accordingly transmitted to the internal gear 24, which then deforms the springs 30 of the spring device 28 with relatively great deflection amplitude and speed. As a result, the impression arises of a low deformation resistance at the springs 30, which are counteracted, due to their greater deflection amplitude and speed, by a stronger deformation resistance of the viscous medium in the chamber 44. The damping effect caused by the viscous medium thus increases.

In summary, it can be stated that it is possible to change, by means of the variable transmission realized according to the invention, on the planetary gear train 102, the deformation behavior of the springs 30 of the spring device 28 as well as the viscosity-based damping behavior, so that in contrast to a torsional vibration damper like that described in the aforementioned German Patent 94 14 314, there is no longer any fixed decoupling speed at which the decoupling quality between the drive-side and the output-side transmission elements assumes an optimum; rather, it is possible to achieve a decoupling range, in which the torsional vibration damper, at each deflection amplitude of the drive-side and output-side transmission elements 3, 46 relative to one another, can assume an optimal decoupling quality for this transmission amplitude, so that regardless of the particular deflection width of the transmission elements 3, 46 the best possible decoupling quality is always ensured. Torsional vibrations introduced on the drive side can therefore be well damped.

The invention is not limited by the embodiments described above which are presented as examples only but can be modified in various ways within the scope of protection defined by the appended patent claims.

I claim:

1. A torsional vibration damper, comprising: a drive-side transmission element; at least one planet carrier rotatable relative to the drive-side transmission element; a planetary gear train including elements which include at least one planetary gear, a sun gear engaged with the planetary gear and an internal gear engaged with the planetary gear; and an output-side transmission element connected to the planet carrier, the planetary gear train elements being drivable for movement dependent on one of speed and rotational direction of the two transmission elements relative to one another, at least two of the planetary of gear train elements each having an associated bearing and being formed, within a predeterminable roll-off range, with a respective contact curve eccentric to the associated bearing of the planetary gear train element whereby it is possible to change a distance of interengagement of the two planetary gear train elements from their bearings so as to adjust the gearing of the planetary gear train as a function of relative deflection width of the transmission elements relative to one another.

2. A torsional vibration damper as defined in claim 1, wherein the planetary gear has a toothed circumference at least partially formed with a continuous diameter change that acts as a contact curve and in toothed connection with a counter-contact curve of at least one other gear of the planetary gear train, the counter contact curve having a diameter change in an opposite sense relative to the contact curve relative to the distance of the interengagement and the bearing, so that the interengagement, in subordination to a particular relative deflection width of the two transmission elements relative to one another, assumes a position which, in keeping with a particular transmission requirement, can be moved out of a neutral position by a predetermined extent in a direction of one of the bearings of the gears that are in toothed connection.

3. A torsional vibration damper as defined in claim 1, wherein the at least two planetary gear train elements are the sun gear and the planetary gear.

4. A torsional vibration damper as defined in claim 2, wherein the contact curve of the planetary gear is in toothed connection with the counter-contact curve of the sun gear.

5. A torsional vibration damper as defined in claim 2, wherein the contact curve of the planetary gear is in toothed connection with the counter-contact curve of the internal gear.

* * * * *